July 5, 1938.  D. C. LOPEZ  2,122,947

SLICING AND DISPENSING DEVICE

Filed May 4, 1936  2 Sheets-Sheet 1

INVENTOR
David C. Lopez
BY J Daniel Stuwe
ATTORNEY

July 5, 1938.　　　D. C. LOPEZ　　　2,122,947
SLICING AND DISPENSING DEVICE
Filed May 4, 1936　　　2 Sheets—Sheet 2

INVENTOR.
BY David C. Lopez
J Daniel Stuwe
ATTORNEY.

Patented July 5, 1938

2,122,947

UNITED STATES PATENT OFFICE 2,122,947

SLICING AND DISPENSING DEVICE

David C. Lopez, Chicago, Ill.

Application May 4, 1936, Serial No. 77,665

4 Claims. (Cl. 31—21)

This invention relates to a new and improved slicing and dispensing device, and more particularly to a device especially adapted for slicing and dispensing butter and similar material which is preferably arranged in blocks of the customary shape and is semi-hard, being adapted to be readily sliced.

One of the main objects of this invention is to provide a slicing and dispensing device of this character which is adapted to house a substantial quantity of the material and to retain it in proper condition, so that either one slice or a considerable number of slices can quickly be cut from the material and dispensed from the device.

Another object of this invention is to provide such a device whereby a single slice, and likewise a plurality of slices, can be freshly cut from the bulk of material and deposited onto a tray, without being engaged by the fingers or pierced by a fork or the like.

A further object of this invention is to provide such a slicing and dispensing device which is equipped with means for maintaining the butter and similar material cooled and in proper sanitary condition while awaiting to be sliced and dispensed.

These and various other objects and advantages are attained with this invention, as will become apparent from the following description, taken in connection with the accompanying drawings wherein the invention is shown in its preferred form, it being understood that various other arrangements and forms of construction may be adopted in carrying out the objects and purposes of this invention. In the drawings.

Figure 1:
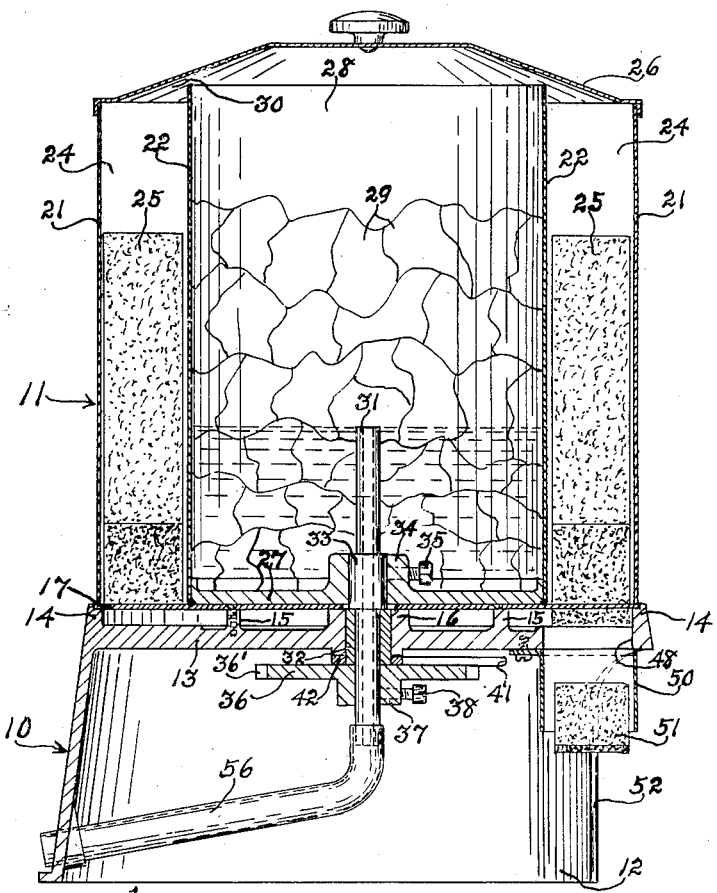
Fig. 1 is a vertical sectional view of this invention, shown in the preferred form of construction, and taken substantially on line 1—1 of Fig. 2.
Figure 2:
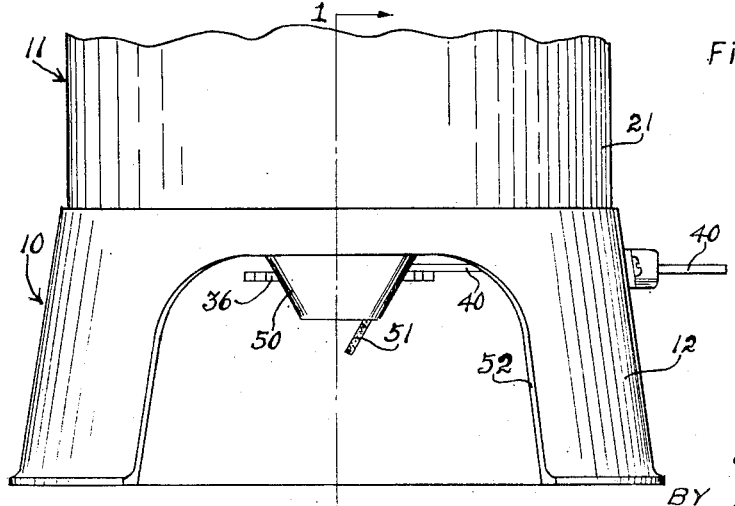
Fig. 2 is a partial front elevational view thereof.

The drawings disclose my invention in its preferred form of construction, comprising a lower base part or supporting means 10, which is stationary; and an upper compartment part or casing 11, which is adapted to contain the material to be sliced, and is movably mounted on said lower part 10.

The lower part 10 comprises a supporting base member 12, which is shown in the form of an inverted cup including a top wall 13 thereon provided with a substantially flat top face having an outer flange or ring 14 and an intermediate flange or ring 15 arising therefrom, and also having an inner hub 16 at its center. A flat top plate 17 is mounted upon said rings 14 and 15, and on hub 16, being removably fastened thereon by screws 18 or the like. It provides a smooth top face upon the supporting means 10, and is preferably made of rust proof metal.

The casing or upper part 11 preferably comprises an outer shell 21 and an inner shell 22 mounted therein and spaced therefrom, as by means of partitions or spacing members 23 which are secured therebetween at spaced intervals. These shells are preferably tubular and concentrically positioned, thereby providing an annular series of compartments 24 around the outer part of the casing.

The compartments 24 are made of a shape to properly fit and to contain the usual blocks of butter or similar material 25, and to enable the same to slide downward therein, for the slicing and dispensing operation, as indicated in Fig. 1. The compartments are open at the top, for placing the blocks of material therein; and they are also open at the bottom, so that the blocks will bear at their lower ends upon the smooth top face of the stationary top plate 17, and can slide thereover when the casing is rotated thereon. A cover 26 is mounted upon the casing, adapted to be readily raised and permit access to the compartments.

Figure 7:
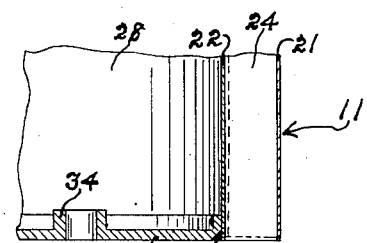
Fig. 7 is a partial vertical sectional view, taken on line 7—7 of Fig. 4.

The inner shell 22 has a bottom wall 27 secured therein, preferably by pressing it therein and applying solder, as indicated at 27' in Fig. 7. Said wall and inner shell thus provide an inner compartment 28 for receiving a cooling medium, like ice 29, adapted to keep the material 25 cool in the series of outer compartments 24. This bottom wall 27 bears on top plate 17, and with the casing is rotatable thereon.

There is a space or air passage 30 provided between the cover 26 and the top end of shell 22, so that there is communication between the inner cooling chamber 28 and the outer material chambers 24, for aiding in cooling the material.

The casing 11 is rotatably mounted on the supporting means 10 by the use of a hollow shaft or journal 31 rotatable in a bushing 32 which is mounted with a press fit in the hub 16 of the top wall 13.

Said shaft has an integral sleeve 33 which fits water-tight within a boss 34 provided centrally on the bottom wall 27. Said sleeve 33 bears upon bushing 32, and a screw 35 is threaded into boss 34, whereby the casing 11 with bottom wall 27 and shaft 31 are adapted to rotate relative to bushing 32 and upon the top plate 17 on the stationary supporting means 10.

Figure 3:
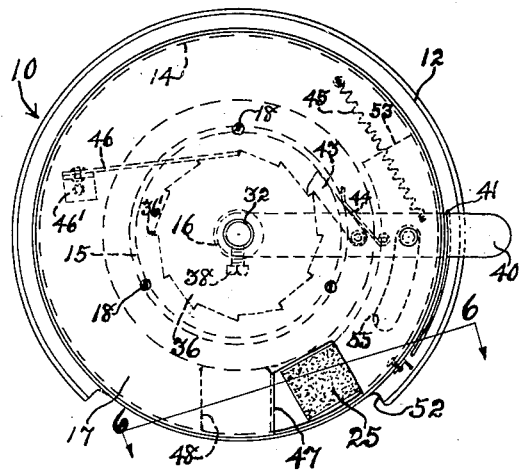
Fig. 3 is a plan view of the lower or supporting part of this invention, which includes the slicing and discharging means, the members being shown in the position of rest.
Figure 4:
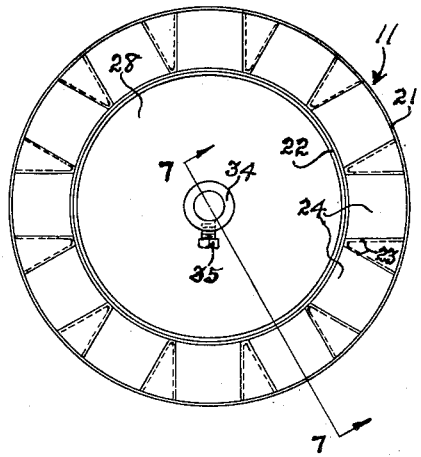
Fig. 4 is a plan view of the upper or casing part of the invention, which includes a series of outer compartments for the material and an inner cooling compartment therein.

The means for rotating the casing, in this disclosed form of my invention, is a manually operated means and comprises a ratchet 36 having a collar 37, whereby it is secured with a screw 38 to shaft 31. A handle 40 is movable in a slot 41 provided in base 12, said handle having an opening at its inner end 42, whereby it is rotatably mounted on bushing 32. A pawl 43 is pivoted on handle 40, and is urged by a spring 44 into engagement with the teeth 36' of the ratchet. Then, since there are as many ratchet teeth 36' as there are compartments 24, a movement of the handle in the operative or forward direction, from one end of slot 41 to the other, will turn the casing for the distance of one tooth, and likewise for the distance of one compartment 24 with its block of material 25 therein. A spring 45, which is connected to handle 40 and to the underside of top wall 13, returns the handle to its position of rest, as indicated in Fig. 3.

Means is also provided for restraining the casing from excessive forward movement, and this preferably includes a spring or resilient member 46 mounted with securing means 46' underneath top wall 13 and pressing yieldably against the teeth of ratchet 36, to retard the rotary motion of it and the casing. This restraining member 46 furthermore engages back of a ratchet tooth 36', to act as a stop pawl for preventing the backward rotation of the ratchet and casing.

Figure 5:
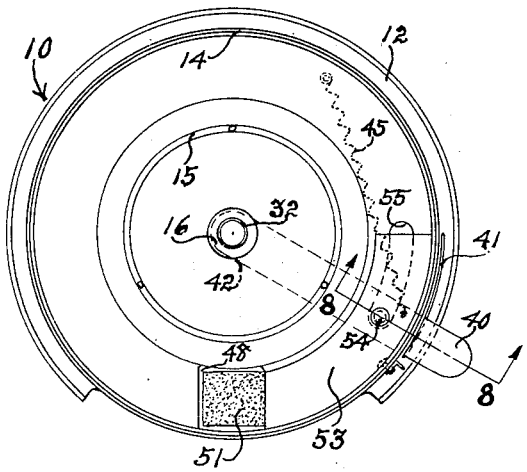
Fig. 5 is a plan view of the lower part, with the top plate removed, showing the members in the material dispensing position, and a slice of material dropping through the discharge opening.
Figure 6:
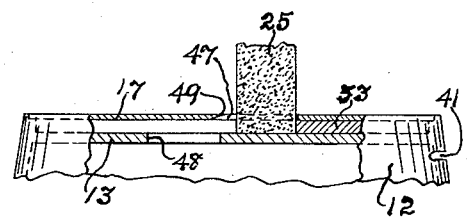
Fig. 6 is a partial vertical sectional view, taken on line 6—6 of Fig. 3.

The slicing and the discharging of the slice are accomplished by providing a notch 47 in the peripheral edge of top plate 17, which serves as a receiving opening through which the lower end of a block of material descends, for the thickness of a slice, and rests upon top wall 13. (See Figs. 1 and 3.) This opening 47 is positioned adjacent a discharge opening 48 provided in the top wall 13. (See Figs. 3 and 5.) A slicing element 49 is placed at the forward edge of opening 47, at the side near the adjoining opening 48, as indicated in Figs. 3 and 6; and this element is conveniently provided by forming a cutting edge on the metal plate 17, adjoining its upper face. A chute 50 may also be provided, being mounted under top wall 13, underneath discharge opening 48, to better guide the sliced piece of material 51 into a suitable receptacle placed below said chute. An opening 52 is provided in the front part of base member 12, to facilitate setting a receptacle under the chute.

Figure 8:
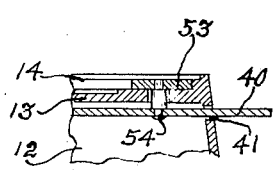
Fig. 8 is a partial vertical sectional view, taken on line 8—8 of Fig. 5.

Means is provided to make sure that the last remaining slice or piece of a block of material will be properly dispensed from this device. This means comprises an arcuate pusher 53 which is mounted between top wall 13 and top plate 17, being slidable on said top wall, inside of its outer ring 14. Said pusher is substantially as wide and as thick as the piece of material is when sliced. A pin 54 has its upper end engaged in pusher 53, extends thru a slot 55 provided in top wall 13, and has its lower end secured in handle 40, as best shown in Fig. 8, so that the pusher moves along with the handle.

With this construction the members of this device are so positioned that initially one compartment will be located directly over the receiving opening 47, and the lower end of the block of material therein will extend down thru said receiving opening, and will rest upon top wall 13, while the blocks in the other compartments will rest with their lower ends upon top plate 17. The pusher 53 bears against the rear end of said extending lower portion of material, as indicated in Figs. 3 and 6. Upon operating handle 40, in a clock-wise direction, as viewed in said Fig. 3, the casing is turned for one compartment with the block of material therein, and the casing then carries forwardly the main part of the block therein, while the pusher bears back of said extending lower portion, said portion being thereby forced against the cutting element 49 to be sliced thereby from the block, and to be positively moved forwardly thereby to the discharge opening 48 to drop thru it and descend thru chute 50 into a receptacle. The spring 45 will automatically return the handle and pusher to the initial position. In the meantime, when the handle and pusher have been returned by spring 45 to the initial position, the lower end of the succeeding block will have descended thru said receiving opening 47 onto the top wall 13, to be sliced by the next operative movement of the handle.

Draining means for the inner compartment 28 is provided by making shaft 31 hollow, in the form of a tube, and connecting a pipe or hose 56 to its lower end to conduct the liquid beyond the device, to a suitable drain or receptacle.

While I have disclosed a certain preferred embodiment of my invention, this is to be taken as illustrative only, as it is capable of change and variation to meet different conditions and requirements, and I contemplate such modifications as come within the spirit and scope of the appended claims.

I claim:

1. A device comprising means for containing blocks of material, means whereon the lower end of said blocks movably bear and wherethru the lower end of a certain block is adapted to extend, means for cutting a slice from the depending end of said block, means wherethru the cut slice is discharged, means for positively moving said slice past the cutting means and into the discharge means, and operating means for actuating the device.

2. A device comprising stationary supporting means provided with a flat top wall part thereon and a head plate spaced thereover which has an opening therein and a slicing edge at the side of said opening, said top wall part having a discharge opening adjacent said cutting edge, forwardly of said plate opening, a casing movably mounted on the supporting means and having a series of compartments adapted to contain blocks of material having their lower end bearing on said head plate, one compartment being located over said plate opening and the lower end of its block extending thru said opening and bearing on said top wall part, a pusher to engage back of said extending block end, and means to operate said casing and said pusher to move said extending block end against said slicing edge to cut the slice and move it to said discharge opening and likewise to discharge any lone last slice.

3. A device comprising a stationary supporting base having a top portion thereon provided with a discharge opening, a top plate on said top portion, provided with a receiving opening therein adjacent and forwardly of said discharge opening, a slicing element on said plate, between the two openings, a casing on said top plate, including a series of compartments for containing blocks of material to be sliced, said compartments being open at the lower ends so that the blocks rest upon said plate, but one compartment with the block therein being located over said receiving opening and said block having its lower end extending thru said receiving opening and bearing upon said top portion, pushing means extending back of said extending block end, and operating means for advancing said casing and pushing means together for slicing said lower extending part from said block by means of said slicing element and dropping it thru said discharge opening.

4. A device comprising stationary supporting means having a flat top portion thereon provided with a discharge opening, a top plate mounted over and spaced from said top portion, having a receiving opening therein adjacent to and forwardly of said discharge opening, a slicing edge provided on the plate, at the side of the receiving opening, adjacent the discharge opening, a casing mounted to rotate on the plate and including an outer and an inner tubular member having partition elements therebetween providing a series of outer compartments for containing blocks of material to be sliced, an inner compartment within said inner tubular member for containing cooling medium to cool said material, said outer compartments being open at the lower ends so that said blocks bear upon said plate, but one compartment being located over said receiving opening and its block extending slightly thru said receiving opening and bearing upon said top portion, pusher means to engage back of said extending part of said block, and operating means to manually operate said casing and the pusher means, whereby to slice said extending part by means of said slicing edge and move said part and any final piece into said discharge opening.

DAVID C. LOPEZ.